July 28, 1964 J. C. ZIVNY 3,142,429

WIDE TAPE DRIVING MECHANISM

Filed Feb. 2, 1962 2 Sheets-Sheet 1

INVENTOR.
JOSEPH C. ZIVNY

BY

Carpenter Abbott Coulter & Kinney

July 28, 1964 J. C. ZIVNY 3,142,429

WIDE TAPE DRIVING MECHANISM

Filed Feb. 2, 1962 2 Sheets-Sheet 2

INVENTOR.
JOSEPH C. ZIVNY

BY

Carpenter, Abbott, Coulter & Kinney

3,142,429
WIDE TAPE DRIVING MECHANISM

Joseph C. Zivny, Riverside, Ill., assignor to Minnesota Mining and Manufacturing Company, St. Paul, Minn., a corporation of Delaware Filed Feb. 2, 1962, Ser. No. 170,552
8 Claims. (Cl. 226—187)

This invention relates to apparatus for handling relatively wide thin gauge tape of the character, for example, of magnetic recording tape, and it more particularly relates to improved tape driving means in such apparatus.

The new thin gauge wide tape, because of its flimsy nature, presents numerous handling problems which have not been previously presented in the use of thicker and narrower tapes. Attempts to use conventional pressure roller-capstan tape drive mechanisms with the thin wide tapes have not proved satisfactory. Skewing and wrinkling of the tape was found to occur even though a pressure roller extending substantially the full width of the tape was used to press the tape against the capstan. This is believed to be attributable to variation in the pressure exerted on the tape by the pressure roller at various points across the width thereof, such variation being the result, for example, of non-uniformity in the hardness of the pressure roller. It was also found that having the pressure roller contact both the tape and the capstan gave rise to tape skewing and wrinkling which is believed to be caused by slippage resulting from the fact that the coefficient of friction between the tape and the capstan is lower than that between the pressure roller and the capstan.

With the above in mind, it is a principal object of the present invention to provide an improved tape-driving mechanism for use in apparatus for handling thin gauge wide tape which mechanism provides a straight-line drive for said tape free from any tendency toward skewing or wrinkling of the tape.

It is a further object of the invention to provide an improved tape-driving mechanism of the aforementioned character in which the tape is pressed against a driving capstan by a pressure roller, there being means provided to insure that said pressure roller exerts a uniform pressure on said tape throughout the length of said roller.

Another object of the invention is to provide an improved tape-driving mechanism of the class described in which the pressure roller applies pressure to the tape substantially throughout the width of the portion of the tape in contact with the capstan, the pressure exerted by said roller being applied to the capstan only through the tape so as to avoid any slippage tending to cause skewing or wrinkling of the tape.

A further object of the invention is to provide an improved tape-driving mechanism including rigid spacer means engageable with and positioned between the capstan and the axle of the pressure roller at each end of the pressure roller for limiting the degree of deformation of said roller and for maintaining the axis thereof parallel with the axis of said capstan when said roller is biased toward the capstan to drive a tape.

Other features and advantages of this invention will become more apparent as the description proceeds, reference being had to the accompanying drawing wherein like reference numerals indicate like parts throughout. It is to be understood, of course, that in commercial applications of the invention various details might well vary somewhat from those here shown and described.

Figure 1:
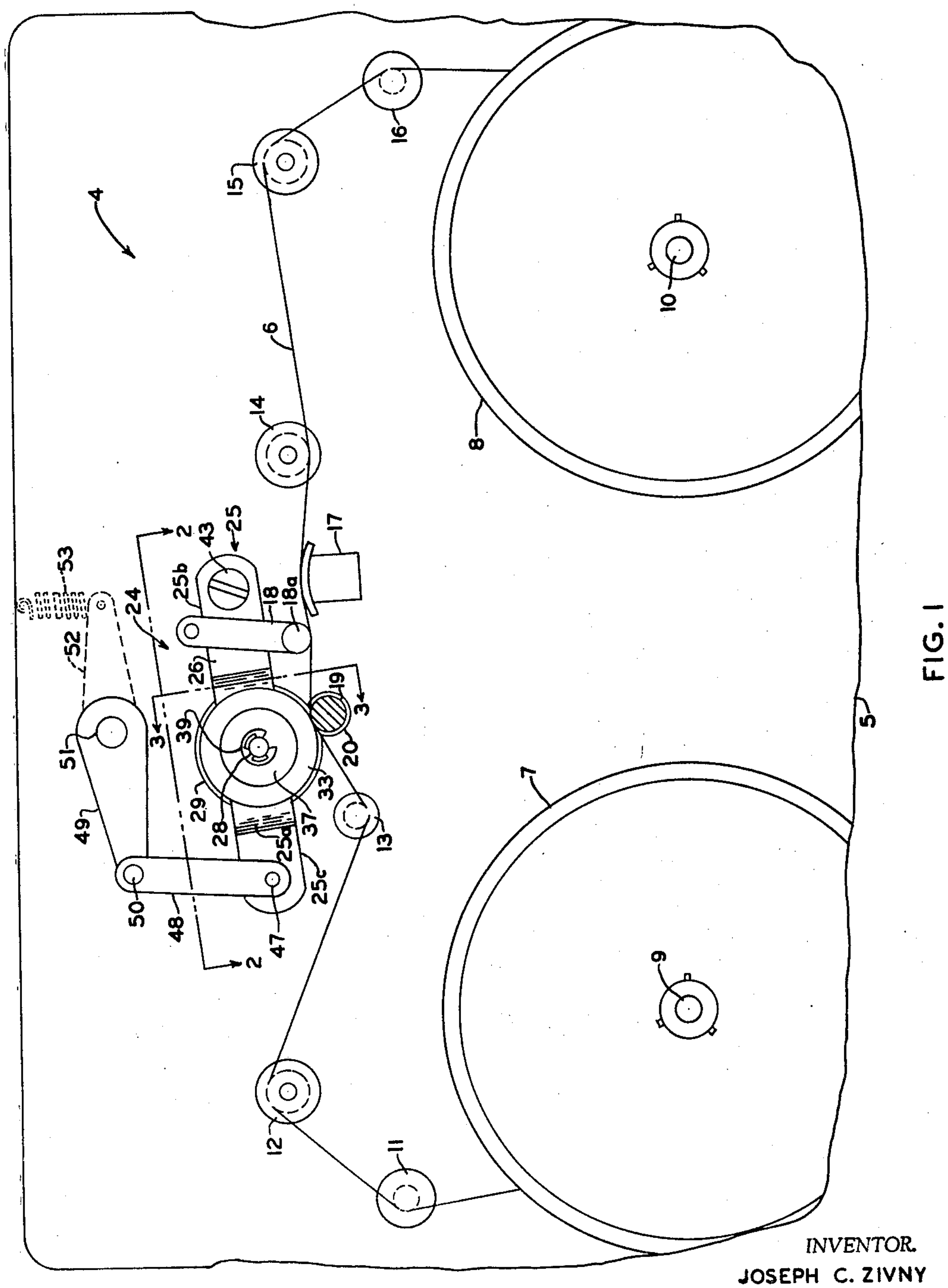
FIGURE 1 is a semi-diagrammatic fragmentary elevational view of a magnetic tape recorder-reproducer embodying the present invention, parts being broken away and shown in section.

Referring to FIGURE 1, the tape-handling apparatus illustrated therein takes the form of a recorder-reproducer generally designated by the numeral 4. The apparatus 4 comprises a mounting plate or panel 5 from which a pair of spindles 9 and 10 project, said spindles coaxially supporting a pair of reels 7 and 8 respectively. The recording medium, in this instance a thin, wide magnetic tape 6, is carried by the reels 7 and 8. Suitable well-known reversible drive means (not shown) are provided for the spindles and reels. In given instances either reel may be acting as the supply reel or as the take-up reel depending upon the direction in which the tape is driven therebetween so they are not specifically designated as such herein.

The thin wide tape 6 referred to herein may, for example, have a normal thickness or gauge of approximately six ten-thousandths of an inch (0.0006"), and a width of one inch (1"). A tape of this type is well adapted to carry eighteen (18) laterally spaced longitudinally extending recording areas or sound tracks. Due to the dimensions of this tape, it is readily apparent that the tape is subject to wrinkling and warpage if not handled properly.

The apparatus in FIGURE 1 further provides means mounted on the panel 5 and defining a predetermined tape path extending between the reels 7 and 8, said means comprising a series of flanged rollers or guide spools 11, 12, 13, 14, 15 and 16, a capstan 19, and a recorder and/or play-back head 17.

The thin wide tape 6 is driven along the aforementioned tape path and past the head 17 by a tape-drive mechanism comprising the rigid cylindrical capstan 19 which is rotatably driven by suitable reversible motor means (not shown), and an idler or pressure roller assembly designated generally by the numeral 24. The capstan 19 is journalled in a bushing 20 fitted in a suitable opening in the panel 5, and is also journalled at its outer end in a suitable bearing 22 carried by a bracket 23 suitably attached to and supported by said panel.

Figure 2:
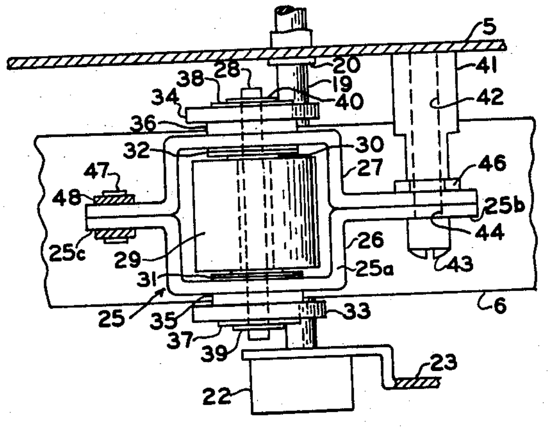
FIGURE 2 is a sectional plan view taken on line 2—2 of FIGURE 1.

The pressure roller assembly 24 comprises a unitary yoke-like member 25 which may be formed of similar frame sections 26 and 27. Sections 26 and 27 are mated as seen in FIGURE 2, and are fixed to each other, as by welding, to form a rectangular frame portion **25*a* and oppositely directed lug portions 25*b* and 25*c*. The lug 25*b* (FIGURE 2) is found with a bore 44 to receive a cap screw 43 which is threaded into a bore 42 formed in a pedestal member 41 fixed to the panel 5. The screw 43 affords a pivotal connection about which the yoke-like member 25 can move, and said screw is provided with a lock nut 46 cooperable with the adjacent end of the pedestal 41**.

Figure 3:
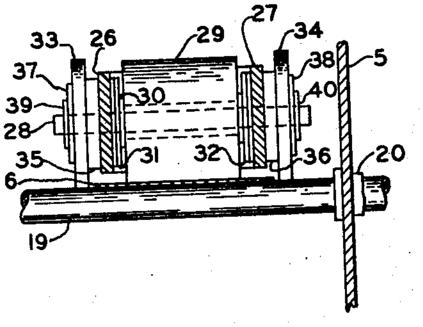
FIGURE 3 is a vertical sectional view taken on line 3—3 of FIGURE 1.

The rectangular frame portion **25*a* is formed with aligned bores affording bearings for a shaft or axle member 28 which has a resilient pressure roller 29 rotatively mounted thereon within the rectangular frame portion 25*a*, said pressure roller preferably being formed of a homogeneous elastomeric material, for example, rubber. As illustrated in FIGURE 3, the pressure roller takes the form of a solid substantially cylindrical tire mounted on a suitable bushing 30 coaxial therewith and which receives the axle member 28 extending therethrough. A pair of separating means 31 and 32, each of which may comprise one or more resilient metal washers, are mounted coaxially on the axle member 28 and centrally position the bushing 30 and thereby the pressure roller 29 within the box-like frame, keeping the same from rubbing on or engaging the frame sections 26 and 27**.

A pair of similar substantially rigid cylindrical rollers or spacer means 33 and 34, preferably formed of nylon, and having a diameter somewhat smaller than the diameter of the pressure roller 29, are journalled on the axle member 28 on opposite ends of the pressure roller 29 respectively, and preferably externally of the rectangular frame portion 25*a*. The rollers 33 and 34 are retained in spaced relation with respect to the frame portion 25*a* by suitable separating means 35 and 36 which may be similar to the separating means 31 and 32. The rigid rollers 33 and 34 are retained on the axle member 28 by washers 37 and 38, respectively, which are, in turn, retained on said axle member by suitable means, for example, the E-shaped snap rings 39 and 40 respectively, disposed in accommodating circumferential grooves formed in the end portions of the axle member.

The pivotal yoke-like frame member 25 thus provides a mounting permitting movement of the pressure roller 29 into and out of engagement with the portion of the tape 6 on the capstan, there being means biasing said frame member, and thereby said pressure roller, toward the capstan. To this end the lug portion 25*c* of the yoke member 25 is pivotally connected as by a pin or rivet 47 to one end of a link 48, the other end of which is pivotally connected, as by a pin 50, to one end of a radial crank arm 49 fixed to a shaft 51 (FIGURE 1). The shaft 51 is rotatably mounted on a suitable bearing extending through the panel 5 and has a second radial crank arm 52 fixed thereto on the other side of said panel. The crank arm 52 is connected at its free end to one end of a coil spring 53, the other end of which is suitably anchored, for example, to the panel 5.

The spring 53 urges the crank formed by the shaft 51 and arms 49 and 52 in a counterclockwise direction as seen in FIGURE 1, thereby forcing the link 48 and the yoke member 25 downward and forcing the resilient pressure roller 29 into engagement with the portion of the tape on the capstan. The spring 53 is of sufficient strength to compressively deform the resilient pressure roller 29 against the tape 6 and bring the nylon rollers 33 and 34 into rolling contact with the capstan 19. The rigid rollers 33 and 34 are disks of equal diameter and, as aforementioned, have a diameter slightly smaller than the normal diameter of the resilient roller 29. The diameter of the rigid rollers 33 and 34 relative to that of the pressure roller 29 determines the maximum amount of compressive deformation said pressure roller can undergo as a result of its being pressed against the portion of the tape 6 engaging the capstan 19. Correlatively, the diameter of the rollers 33 and 34 also limits the maximum force which the pressure roller 29 can exert on the portion of the tape engaging the capstan to that sufficient to effect the aforementioned predetermined maximum deformation of the pressure roller. This predetermined maximum force is that which is sufficient to properly drive the tape and is substantially independent of any tendency of the spring 53 to press the pressure roller 29 against the tape with greater force than said predetermined maximum.

The pressure roller 29 preferably has an axial dimension not greater than the transverse dimension of the tape 6, but greater than half the transverse dimension, such that said roller contacts a major portion of said tape but does not contact the capstan 19 when compressed against the tape. The rigid rollers 33 and 34, on the other hand, contact the capstan 19 adjacent the edges of the tape as shown, and act to maintain a continuous predetermined spaced parallel relationship between the axis of the axle member 28 and the axis of the capstan 19. By maintaining this predetermined spaced parallel relationship, a uniform and controlled pressure is applied to the tape throughout the length of the resilient pressure roller 29, avoiding any tendency toward slippage or skewing of the tape characteristic of drive mechanisms creating varying frictional relationships between the tape and capstan. The improved tape-driving mechanism thus drives the tape along the predetermined path without any tendency toward skewing or wrinkling irrespective of the direction in which the tape is driven between the reels 7 and 8.

A snubber 18 may be adjustably secured to the lug portion 25*b* of the yoke member 25. The snubber 18 comprises a cylindrical tape-engaging portion 18*a* adapted to engage the tape 6 across the entire width thereof to thereby maintain the tape in proper engagement with the head 17.

While the preferred embodiment of the invention has been illustrated and described, it will be understood that many changes in construction may be made, within the scope of the appended claims, without departing from the spirit of the invention.

I claim:

1. In tape-handling apparatus or the like, driving means adapted to drive a tape comprising, a capstan, a resilient pressure roller adapted to press a tape against said capstan to be driven thereby, an axle extending within said roller in coaxial relationship therewith, means supporting said axle, and means comprising a pair of substantially rigid rollers engageable with said capstan and carried by said axle at opposite ends of said pressure roller for defining an operative position of said roller wherein the axis of the axle is parallel with the axis of said capstan, the radius of said rollers being not greater than the normal radius of said pressure roller.

2. Driving means as claimed in claim 1 wherein said pressure roller is positioned for engagement with the tape only, and has a length not greater than the width of said tape but at least sufficient to engage the tape over the major portion of the width thereof, and said rigid rollers being engageable with said rigid capstan adjacent opposite edges of the tape.

3. In tape-handling apparatus or the like, driving means adapted to drive a tape comprising, a driven capstan, an elongated resilient pressure roller adapted to engage a tape on said capstan transversely thereof, an axle member extending through and coaxially supporting said pressure roller, a frame supporting said axle member generally parallel with said capstan, means pivotally supporting said frame for movement of said axle toward and away from said capstan, a substantially rigid roller journalled on each end of said axle member and positioned for rolling engagement with said capstan adjacent the edges of said tape, each said rigid roller having a diameter smaller than the normal diameter of said resilient roller, and means for biasing said frame and thereby the pressure and rigid rollers toward said capstan to compress said resilient roller against a tape and place the rigid rollers in engagement with said capstan.

4. In a magnetic recording tape handling apparatus, a drive mechanism for accurately driving a wide multi-track tape in a straight line free from any tendency toward skewing or wrinkling which would result in misalignment of said tape having in combination a cylindrical driven capstan, a resiliently deformable elastomeric cylindrical pressure roller, means for rotatably supporting said pressure roller in operative position for engagement with a tape to press the same into driving contact with said capstan, means biasing said supporting means and said pressure roller into said operative position, and means for maintaining the axis of said pressure roller parallel with the axis of said capstan and for limiting to a predetermined value the maximum deformation which said pressure roller can undergo when so biased against a said tape comprising a pair of spaced identical-diameter rigid disks supported in coaxial relation with said pressure roller, said disks being engageable with said capstan and having a diameter not greater than the normal diameter of said pressure roller.

5. In a magnetic recording tape handling apparatus, a drive mechanism for accurately driving wide tape in a straight line free from skewing or wrinkling having in combination a cylindrical capstan, an elongate cylindrical resilient pressure roller, axle means rotatably supporting said pressure roller, a frame supporting said axle means which is biased toward said capstan to place said pressure roller in operative driving engagement with a said tape, a substantially rigid disk rotatably mounted on said axle means adjacent each end of said pressure roller and positioned for rolling engagement with said capstan adjacent the edges of a said tape, each said disk having a diameter not greater than the normal diameter of said pressure roller, and said pressure roller having an axial length less than the width of a said tape but greater than half the width thereof.

6. In a magnetic recording tape handling apparatus, a drive mechanism for accurately driving a wide multitrack tape in a straight line free from any tendency toward skewing or wrinkling which would result in misalignment of said tape having in combination a driven capstan, a resiliently deformable pressure roller, means for rotatably supporting said pressure roller in operative position with respect to said capstan for driving a tape including means biasing said pressure roller into said operative position, and a pair of spaced, substantially rigid identical-diameter disks, one disk of said pair being positioned adjacent one end of and coaxially with said pressure roller, the other disk of said pair being positioned adjacent the other end of and coaxially with said pressure roller, said disks being adapted to engage said capstan when said pressure roller is in operative position, thus limiting the deformation of said pressure roller and maintaining the axis of said pressure roller parallel to the axis of said capstan when said pressure roller is in said operative position.

7. In a tape-handling apparatus, means for driving wide magnetic recording tape in a straight line free from skewing or wrinkling having in combination, a cylindrical capstan, a resiliently deformable cylindrical pressure roller, means rotatably supporting said pressure roller in confronting relation with said capstan, biasing means for bringing said supporting means toward said capstan to position said pressure roller in engagement with a tape to press the tape in driving engagement with said capstan, and spacer means carried by said supporting means and engageable with said capstan adjacent each end of said pressure roller to afford predetermined deformation of said pressure roller when in engagement with a tape and to maintain the axis of said pressure roller parallel with the axis of said capstan.

8. In a tape-handling apparatus or the like, driving means adapted to drive a tape comprising a capstan, a resilient pressure roller adapted to press a tape against said capstan to be driven thereby, an axle rotatively supporting said roller, rigid spacer means engageable with and positioned between said axle and said capstan at each end of said pressure roller and when in such engagement defining an operative position of said roller wherein the axis thereof is parallel with the axis of said capstan, and means for placing said pressure roller in said operative position to drive a tape.

References Cited in the file of this patent

UNITED STATES PATENTS

| | | |
|---|---|---|
| 2,246,004 | Rich | June 17, 1941 |
| 2,274,834 | Ira | Mar. 3, 1942 |
| 2,786,672 | Humphner | Mar. 26, 1957 |
| 2,959,334 | Uritis | Nov. 8, 1960 |
| 2,990,092 | Begun et al. | June 27, 1961 |
| 2,995,287 | Namenyi Katz | Aug. 8, 1961 |
| 3,072,310 | Kunz | Jan. 8, 1963 |
| 3,077,293 | Watkins | Feb. 12, 1963 |

UNITED STATES PATENT OFFICE

CERTIFICATE OF CORRECTION

Patent No. 3,142,429 July 28, 1964

Joseph C. Zivny

It is hereby certified that error appears in the above numbered patent requiring correction and that the said Letters Patent should read as corrected below.

Column 4, line 27, after "said" insert -- rigid --; line 34, strike out "rigid"; column 6, line 14, for "In a tape-handling" read -- In tape-handling --.

Signed and sealed this 24th day of November 1964.

(SEAL)
Attest:

ERNEST W. SWIDER
Attesting Officer

EDWARD J. BRENNER
Commissioner of Patents